(12) United States Patent
Taylor et al.

(10) Patent No.: US 11,117,432 B2
(45) Date of Patent: Sep. 14, 2021

(54) BALL JOINT PROTECTION COVER FOR USE ON HITCH MOUNTS

(71) Applicant: Process4, Inc., Chagrin Falls, OH (US)

(72) Inventors: Curtis Taylor, Chagrin Falls, OH (US); Matthew Hanson, Chagrin Falls, OH (US)

(73) Assignee: Process4, Inc., Chagrin Falls, OH (US)

( * ) Notice: Subject to any disclaimer, the term of this patent is extended or adjusted under 35 U.S.C. 154(b) by 195 days.

(21) Appl. No.: 16/503,825

(22) Filed: Jul. 5, 2019

(65) Prior Publication Data

US 2020/0016947 A1    Jan. 16, 2020

Related U.S. Application Data

(60) Provisional application No. 62/696,555, filed on Jul. 11, 2018.

(51) Int. Cl.
*B60D 1/60* (2006.01)
*B60D 1/06* (2006.01)

(52) U.S. Cl.
CPC ............... *B60D 1/605* (2013.01); *B60D 1/06* (2013.01)

(58) Field of Classification Search
CPC .................................................... B60D 1/605
See application file for complete search history.

(56) References Cited

U.S. PATENT DOCUMENTS

| 2,714,912 A * | 8/1955 | Gonnella | B60D 1/605 |
| | | | 150/154 |
| 5,037,122 A * | 8/1991 | Beckerer, Jr. | B60D 1/605 |
| | | | 280/507 |

FOREIGN PATENT DOCUMENTS

| EP | 0937593 A1 * | 8/1999 | B60D 1/60 |
| WO | WO-9116211 A1 * | 10/1991 | B60D 1/60 |

* cited by examiner

*Primary Examiner* — Kevin Hurley
(74) *Attorney, Agent, or Firm* — Ulmer & Berne LLP; Brian E. Turung

(57) ABSTRACT

Components and devices are disclosed which are made from or otherwise include a protective material configured to release corrosion protection molecules. These exemplary components and devices can be included with trailer hitch mounts, hitch mount assemblies, and associated hardware to provide protection against rust and corrosion.

29 Claims, 2 Drawing Sheets

BALL JOINT PROTECTION COVER FOR USE ON HITCH MOUNTS

The present disclosure claims priority on U.S. Patent Application Ser. No. 62/696,555 filed Jul. 11, 2018, which is incorporated herein by reference.

The present disclosure is directed to components and devices provided with hitch mount and hitch mount assemblies of trailers and vehicles and which are made from or otherwise include a protective material configured to release corrosion protection molecules. The present disclosure is also directed to hardware components, which may or may not be included with the hitch and hitch mount assemblies, and which are also made from or otherwise include a protective material configured to release corrosion protection molecules.

BACKGROUND ON THE INVENTION

There are a variety of hitch mount assemblies in use in the marketplace today. A ball-type trailer hitch is common and can be either permanently or temporarily attached to the frame or bumper of a vehicle. Many hitch mount assemblies are used in connection with boat trailers, camping trailers, moving trailers, etc. Often these hitch mounts and hitch mount assemblies are made from or otherwise include components made from metal. Moreover, often these hitch mounts, hitch mount assemblies, and associated hardware are exposed to the environment for long periods of time. As a result, known hitch mounts, hitch mount assemblies, and associated hardware exhibit undesirable rusting and corrosion that shortens the life of these devices and/or disfigures the appearance of these devices.

In view of the prior art, there remains a need for a device that can be connected to a hitch mount assembly to protect the hitch mount assembly against rust and corrosion.

BRIEF DESCRIPTION OF THE DISCLOSURE

The present disclosure is directed to the use of one or more corrosion protective components to inhibit or prevent corrosion of one or more parts of a hitch mount assembly.

In one non-limiting aspect of the present disclosure, one or more corrosion protective components are provided as a cover configured to cover to one or more parts of a hitch mount assembly so as to provide corrosion protection to one or more parts of the hitch mount assembly.

The corrosion-inhibiting protection cover can be fully or partially formed of or include a protective material that releases corrosion protection molecules (e.g., volatile corrosion inhibitors (VCIs), vapor phase inhibitors (VPIs), etc.). Non-limiting VCI materials include VCI petroleum-based coating (e.g., blend of oxidized petrolatum, calcium salts, petroleum sulfonate, amine carboxylates, mineral spirits), VCI latex coating (e.g., acrylic latex, calcium salt of organo sulfonic acid, and amine carboxylates), VCI solvent-based epoxy (e.g., bisphenol A epoxy with aliphatic amine, oxidized petrolatum, calcium salts, petroleum sulfonates, amine carboxylates, and mineral spirits), VCI-modified water-based alkyds (e.g., EPS 2601 alkyd, calcium salt of an organo sulfonic acid, and an amino carboxylate), water-based alkyd (e.g., EPS 2601), zinc-rich epoxy primer (e.g., bisphenol A, aliphatic amine, zinc pigment, 3921 epoxy). Commercially available VCIs are offered by Lowes, Cabellas, Flambeau, Kobalt, etc. Exemplary raw materials having the vapor corrosion-inhibiting substance are commercially available from Zerust®.

In another and/or alternative non-limiting aspect of the present disclosure, there is provided a corrosion-inhibiting protection device in the form of a corrosion-inhibiting protective cover that can provide corrosion protection to a hitch component (e.g., towing implement, ball joint, etc.) that is mounted to an associated hitch mount assembly, and wherein the corrosion-inhibiting protective cover is configured to be placed at least partially about the hitch component, wherein the corrosion-inhibiting protective cover is optionally partially formed of the protective material which releases corrosion protection molecules that are configured to at least partially provide corrosion protection to the hitch component and optionally to the associated hitch mount assembly to which the hitch component is connected thereto.

In another and/or alternative non-limiting aspect of the present disclosure, there is provided a corrosion-inhibiting protection device in the form of a corrosion-inhibiting protective cover that can provide corrosion protection to a hitch component wherein the corrosion-inhibiting protective cover is configured to cover 30-100 vol. % (and all values and ranges therebetween) of the hitch component and 0-90 vol. % (and all values and ranges therebetween) of the associated hitch mount assembly to which the hitch component is connected thereto, and typically the corrosion-inhibiting protective cover is configured to cover 60-100 vol. % of the hitch component and 0-60 vol. % of the associated hitch mount assembly to which the hitch component is connected thereto. In one non-limiting example, the corrosion-inhibiting protective cover is configured to cover 75-100 vol. % of the ball joint of a hitch mount assembly. Commercially available ball joints generally have the maximum diameter size of the generally spherically-shaped top portion of at least 1⅞ inches and up to about 3-4 inches. The height of the ball joints when mounted on a tongue is at least 2 inches and up to 10 inches.

In another and/or alternative non-limiting aspect of the present disclosure, there is provided a corrosion-inhibiting protection device in the form of a corrosion-inhibiting protective cover that can provide corrosion protection to a hitch component (e.g., towing implement, ball joint, etc.) that is mounted to an associated hitch mount assembly, and wherein the corrosion-inhibiting protective cover is configured to be placed at least partially about the hitch component, wherein the corrosion-inhibiting protective cover is optionally partially formed of the protective material which releases corrosion protection molecules that are configured to at least partially provide corrosion protection to the hitch component and optionally to the associated hitch mount assembly to which the hitch component is connected thereto, and wherein the corrosion-inhibiting protective cover is formed of multiple components that can be releasably connected together by various arrangements (e.g., screw, bolt, adhesive, snap, clamp, lock, hook and loop fastener, friction connection, clip, etc.).

In another and/or alternative non-limiting aspect of the present disclosure, there is provided a corrosion-inhibiting protection device in the form of a corrosion-inhibiting protective cover that can provide corrosion protection to a hitch component (e.g., towing implement, ball joint, etc.) that is mounted to an associated hitch mount assembly, and wherein the corrosion-inhibiting protective cover is configured to be placed at least partially about the hitch component, wherein the corrosion-inhibiting protective cover is optionally partially formed of the protective material which releases corrosion protection molecules that are configured to at least partially provide corrosion protection to the hitch component and optionally to the associated hitch mount assembly to which the hitch component is connected thereto, and wherein the corrosion-inhibiting protective cover is formed of a single piece, and wherein said material used to form a portion or all of the corrosion-inhibiting protective cover is a thermoplastic elastomer (TPE) and/or EPDM thermoset rubber. One non-limiting material is a thermoplastic vulcanizates TPV commercially available as Santoprene®. Generally, the material is a stretchable material having a Durometer Shore A of 20-95 (and all values and ranges therebetween), typically a Durometer Shore A of 40-90, and still more typically a Durometer Shore A of 55-80. In one non-limiting embodiment, the thickness of the material is generally about 0.5-20 mm (and all values and ranges therebetween), and typically about 1-10 mm. In one non-limiting embodiment, the corrosion-inhibiting protective cover is formed of a material that enable the corrosion-inhibiting protective cover to be stretched over at least a portion of the hitch component (e.g., ball joint) such that the material at least partially or fully reforms to its original prestretched shape after the corrosion-inhibiting protective cover is placed about the hitch component. As such, the material used to form the corrosion-inhibiting protective cover is a stretchable material that reforms to 90-100% of its original shape after being stretched. Such a feature of the material of the corrosion-inhibiting protective cover allows the corrosion-inhibiting protective cover to be removed from and placed one or more times on a portion of the hitch component without damaging the corrosion-inhibiting protective cover or the hitch component. In one non-limiting embodiment, the material of the corrosion-inhibiting protective cover is formed of a non-abrasive material (e.g., soft material) such that the material does not scratch or otherwise damage the hitch component when the corrosion-inhibiting protective cover is placed on and removed from the hitch component. In one non-limiting arrangement, the material is required to stretch so as to increase in size of about 1-20% (and all values and ranges therebetween) when the corrosion-inhibiting protective cover is placed about a ball joint and/or is fully positioned on the ball joint. In other words, the volume of the material must be increased for the corrosion-inhibiting protective cover to be placed about and then fitted on at least a portion of the ball joint. Such a stretch fit is used to facilitate in maintaining the corrosion-inhibiting protective cover on the ball joint.

In another and/or alternative non-limiting aspect of the present disclosure, there is provided a corrosion-inhibiting protection device in the form of a corrosion-inhibiting protective cover that can provide corrosion protection to a hitch component (e.g., towing implement, ball joint, etc.) that is mounted to an associated hitch mount assembly, and wherein the corrosion-inhibiting protective cover is configured to be placed at least partially about the hitch component, wherein the corrosion-inhibiting protective cover is optionally partially formed of the protective material which releases corrosion protection molecules that are configured to at least partially provide corrosion protection to the hitch component and optionally to the associated hitch mount assembly to which the hitch component is connected thereto, and wherein the corrosion-inhibiting protective cover has a shape that covers the top portion of the hitch component. In one non-limiting embodiment, the top portion of the corrosion-inhibiting protective cover has a partial spherical shape that is configured to fit about a top portion of a ball joint, and located below the partial spherical shape portion of the corrosion-inhibiting protective cover is a transition portion, and located below the transition portion is a base portion, and the base portion is configured to fit about a base of the ball joint. In one non-limiting embodiment, a portion of the top portion of the corrosion-inhibiting protective cover is configured to engage a portion of the top portion of the ball joint when the corrosion-inhibiting protective cover is placed on the ball joint. In one non-limiting example, at least 50% of the interior surface of the top portion of the corrosion-inhibiting protective cover engages a portion of the top portion of the ball joint when the corrosion-inhibiting protective cover is placed on the ball joint, and more particularly at least 60% of the interior surface of the top portion of the corrosion-inhibiting protective cover engages a portion of the top portion of the ball joint when the corrosion-inhibiting protective cover is placed on the ball joint. In one non-limiting embodiment, the transition portion is configured to not contact the ball joint with the corrosion-inhibiting protective cover is placed on the ball joint; however, this is not required. In one non-limiting example, less than 50% of the interior surface of the transition portion of the corrosion-inhibiting protective cover engages the ball joint when the corrosion-inhibiting protective cover is placed on the ball joint, and more particularly less than 30% of the interior surface of the transition portion of the corrosion-inhibiting protective cover engages the ball joint when the corrosion-inhibiting protective cover is placed on the ball joint. In one non-limiting embodiment, the transition portion can be curved or arcuate shaped and is the transition section between the top and bottom portions of the corrosion-inhibiting protective cover; however, it can be appreciated that the transition portion can have other shapes. In one non-limiting embodiment, the volume percent of the transition portion is less than the volume percent of the top portion. In one non-limiting embodiment, the volume percent of the transition portion is less than the volume percent of the bottom portion; however, this is not required. In one non-limiting embodiment, the bottom portion has a constant cross-sectional size and shape along at least 50% the longitudinal length of the bottom portion, and typically the bottom portion has a constant cross-sectional size and shape along at least 75% the longitudinal length of the bottom portion. In one non-limiting embodiment, the bottom portion is configured to engage a portion of the ball joint when the corrosion-inhibiting protective cover is placed on the ball joint. In one non-limiting example, at least 10% of the interior surface of the bottom portion of the corrosion-inhibiting protective cover engages a portion of the ball joint when the corrosion-inhibiting protective cover is placed on the ball joint, and more particularly at least 20% of the interior surface of the bottom portion of the corrosion-inhibiting protective cover engages a portion of ball joint when the corrosion-inhibiting protective cover is placed on the ball joint.

In another and/or alternative non-limiting aspect of the present disclosure, there is provided a corrosion-inhibiting protection device in the form of a corrosion-inhibiting protective cover that can provide corrosion protection to a hitch component (e.g., towing implement, ball joint, etc.) that is mounted to an associated hitch mount assembly, and wherein the corrosion-inhibiting protective cover is configured to be placed at least partially about the hitch component, wherein the corrosion-inhibiting protective cover is formed of or includes the protective material which releases corrosion protection molecules. In one non-limiting embodiment, the material that is used to form the corrosion-inhibiting protective cover includes the protective material. For example, the material can be a mixture of protective material and thermoplastic elastomer. In one non-limiting example, the material used to form the corrosion-inhibiting protective cover includes 60-99.9 wt. % thermoplastic elastomer (and all values and ranges therebetween) and 0.1-40 wt. % protective material (and all values and ranges therebetween), typically 70-99.5 wt. % thermoplastic elastomer and 0.5-30 wt. % protective material, and more typically 80-99.5 wt. % thermoplastic elastomer (and all values and ranges therebetween) and 0.5-20 wt. % protective material. When the material used to form the corrosion-inhibiting protective cover includes the protective material, the corrosion protection molecules release (e.g., continuously release) over time from the material.

In another and/or alternative non-limiting aspect of the present disclosure, there is provided a corrosion-inhibiting protection device in the form of a corrosion-inhibiting protective cover that can provide corrosion protection to a hitch component (e.g., towing implement, ball joint, etc.) that is mounted to an associated hitch mount assembly, and wherein the corrosion-inhibiting protective cover is configured to be placed at least partially about the hitch component, wherein the protective material which releases corrosion protection molecules can be permanently or releasably connected to the housing of the corrosion-inhibiting protective cover. In one non-limiting embodiment, the protective material which releases corrosion protection molecules can be secured to the housing via a connection arrangement (e.g., adhesive, snap, clamp, hook and loop fastener, friction connection, clip, etc.). When the protective material which releases corrosion protection molecules can be releasably connected to the housing of the corrosion-inhibiting protective cover, the protective material which releases corrosion protection molecules can be periodically replaced on the housing when needed. For example, strips of protective material which releases corrosion protection molecules or a sleeve of protective material which releases corrosion protection molecules can be provided that can be releasably connected to the housing of the corrosion-inhibiting protective cover.

In another and/or alternative non-limiting aspect of the present disclosure, there is provided a corrosion-inhibiting protection device that includes a visual indicator or includes date information to provide information to a user about whether the corrosion-inhibiting protection device needs to be replaced and/or the protective material on the corrosion-inhibiting protection device needs to be replaced. In one non-limiting embodiment, the corrosion-inhibiting protection device includes an expiration or replacement date that is stamped or otherwise applied to the corrosion-inhibiting protection device so as to provide information to the user when the corrosion-inhibiting protection device needs to be replaced and/or the protective material on the corrosion-inhibiting protection device needs to be replaced. The location of such expiration or replacement date on the corrosion-inhibiting protection device is non-limiting. In another non-limiting embodiment, the corrosion-inhibiting protection device includes a time indicator that is configured to visually display an operational time of the corrosion-inhibiting protection device. The configuration of the time indicator is non-limiting. In one non-limiting specific example, the time indicator is a TIMESTRIP® from Timestrip LTD such as described in U.S. Pat. Nos. 7,232,253 and 7,362,663, incorporated by reference herein.

It is one non-limiting object of the present disclosure to provide a corrosion-inhibiting protection device in the form of a corrosion-inhibiting protective cover for use with a hitch mount assembly.

It is another and/or alternative non-limiting object of the present disclosure to provide a corrosion-inhibiting protection device in the form of a corrosion-inhibiting protective cover for use with a hitch mount assembly. The corrosion-inhibiting protective cover comprises a cover body having a size and shape to enable said cover body to at least partially cover or encircle at least a portion of the hitch mount assembly. The corrosion-inhibiting protective cover is configured to be retained on a portion of the hitch mount assembly by a shape and/or configuration of the cover body that facilitates in maintaining the cover body on a portion of the hitch mount assembly once the cover body is fully positioned on a portion of the hitch mount assembly. The cover body includes a cover material that at least partially includes a protective material. The protective material is formed of or includes a material that releases corrosion protection molecules.

It is another and/or alternative non-limiting object of the present disclosure to provide a corrosion-inhibiting protection device in the form of a corrosion-inhibiting protective cover for use with a hitch mount assembly wherein the cover body is shaped and/or configured to at least partially cover or encircle a ball joint.

It is another and/or alternative non-limiting object of the present disclosure to provide a corrosion-inhibiting protection device in the form of a corrosion-inhibiting protective cover for use with a hitch mount assembly wherein the cover body is formed of a single piece of material.

It is another and/or alternative non-limiting object of the present disclosure to provide a corrosion-inhibiting protection device in the form of a corrosion-inhibiting protective cover for use with a hitch mount assembly wherein the cover body is a) at least partially formed of the protective material, b) at least partially coated with the protective material, and/or c) includes a cavity that includes the protective material.

It is another and/or alternative non-limiting object of the present disclosure to provide a corrosion-inhibiting protection device in the form of a corrosion-inhibiting protective cover for use with a hitch mount assembly wherein the protective material includes volatile corrosion inhibitors and/or vapor phase inhibitors.

It is another and/or alternative non-limiting object of the present disclosure to provide a corrosion-inhibiting protection device in the form of a corrosion-inhibiting protective cover for use with a hitch mount assembly wherein the cover body is configured to cover 30-100 vol. % of a portion of the hitch mount assembly It is another and/or alternative non-limiting object of the present disclosure to provide a corrosion-inhibiting protection device in the form of a corrosion-inhibiting protective cover for use with a hitch mount assembly wherein the hitch mount assembly includes a ball joint.

It is another and/or alternative non-limiting object of the present disclosure to provide a corrosion-inhibiting protection device in the form of a corrosion-inhibiting protective cover for use with a hitch mount assembly wherein the cover material includes a thermoplastic elastomer and/or thermoset rubber.

It is another and/or alternative non-limiting object of the present disclosure to provide a corrosion-inhibiting protection device in the form of a corrosion-inhibiting protective cover for use with a hitch mount assembly wherein the cover material includes 70-98 wt. % thermoplastic elastomer and/or thermoset rubber and 2-30 wt. % protective material.

It is another and/or alternative non-limiting object of the present disclosure to provide a corrosion-inhibiting protection device in the form of a corrosion-inhibiting protective cover for use with a hitch mount assembly wherein the cover material includes a thermoplastic elastomer and/or thermoset rubber having Durometer Shore A of 40-90.

It is another and/or alternative non-limiting object of the present disclosure to provide a corrosion-inhibiting protection device in the form of a corrosion-inhibiting protective cover for use with a hitch mount assembly wherein the cover material has a thickness of about 1-10 mm.

It is another and/or alternative non-limiting object of the present disclosure to provide a corrosion-inhibiting protection device in the form of a corrosion-inhibiting protective cover for use with a hitch mount assembly wherein the cover material is a stretchable material that reforms to 90-100% of its original shape after being stretched.

It is another and/or alternative non-limiting object of the present disclosure to provide a method of inhibiting or preventing oxidation and/or corrosion of one or more components of a hitch mount assembly comprising a) providing a hitch mount assembly; b) providing a corrosion-inhibiting protective cover, wherein the corrosion-inhibiting protective cover comprises a cover body having a size and shape to enable the cover body to at least partially cover or encircle at least a portion of the hitch mount assembly, and wherein the corrosion-inhibiting protective cover is configured to be retained on a portion of the hitch mount assembly by a shape and/or configuration of the cover body that facilitates in maintaining the cover body on a portion of the hitch mount assembly once the cover body is fully positioned on a portion of the hitch mount assembly, and wherein the cover body includes a cover material that at least partially includes a protective material, and wherein the protective material is formed of or includes a material that releases corrosion protection molecules; c) placing the corrosion-inhibiting protective cover on about at least a portion of the hitch mount assembly; and, d) having the corrosion protection molecules that are released from the protective material at least partially protect one or more components of the hitch mount assembly from oxidation and/or corrosion.

It is another and/or alternative non-limiting object of the present disclosure to provide a method of inhibiting or preventing oxidation and/or corrosion of one or more components of a hitch mount assembly that further includes the step of stretching the cover material so as to place the cover body on about at least a portion of the hitch mount assembly, and wherein the cover material is a stretchable material that reforms to 90-100% of its original shape after being stretched.

It is another and/or alternative non-limiting object of the present disclosure to provide a method of inhibiting or preventing oxidation and/or corrosion of one or more components of a hitch mount assembly wherein the cover material remains in a stretched state after the cover body has been placed on about at least a portion of the hitch mount assembly, and wherein a size of the cover body is at least 1% greater in the stretched state while the cover body is placed on about at least a portion of the hitch mount assembly It is another and/or alternative non-limiting object of the present disclosure to provide a method of inhibiting or preventing oxidation and/or corrosion of one or more components of a hitch mount assembly wherein the cover body is shaped and/or configured to at least partially cover or encircle a ball joint on the hitch mount assembly.

It is another and/or alternative non-limiting object of the present disclosure to provide a method of inhibiting or preventing oxidation and/or corrosion of one or more components of a hitch mount assembly wherein the cover body is formed of a single piece of material.

It is another and/or alternative non-limiting object of the present disclosure to provide a method of inhibiting or preventing oxidation and/or corrosion of one or more components of a hitch mount assembly wherein the cover body is a) at least partially formed of the protective material, b) at least partially coated with the protective material, and/or d) includes a cavity that includes the protective material.

It is another and/or alternative non-limiting object of the present disclosure to provide a method of inhibiting or preventing oxidation and/or corrosion of one or more components of a hitch mount assembly wherein the protective material includes volatile corrosion inhibitors and/or vapor phase inhibitors.

It is another and/or alternative non-limiting object of the present disclosure to provide a method of inhibiting or preventing oxidation and/or corrosion of one or more components of a hitch mount assembly wherein the cover body is configured to cover 30-100 vol. % of a portion of said hitch mount assembly.

It is another and/or alternative non-limiting object of the present disclosure to provide a method of inhibiting or preventing oxidation and/or corrosion of one or more components of a hitch mount assembly wherein the hitch mount assembly includes a ball joint.

It is another and/or alternative non-limiting object of the present disclosure to provide a method of inhibiting or preventing oxidation and/or corrosion of one or more components of a hitch mount assembly wherein the cover material includes a thermoplastic elastomer and/or thermoset rubber.

It is another and/or alternative non-limiting object of the present disclosure to provide a method of inhibiting or preventing oxidation and/or corrosion of one or more components of a hitch mount assembly wherein the cover material includes 70-98 wt. % thermoplastic elastomer and/or thermoset rubber and 2-30 wt. % protective material.

It is another and/or alternative non-limiting object of the present disclosure to provide a method of inhibiting or preventing oxidation and/or corrosion of one or more components of a hitch mount assembly wherein the cover material includes a thermoplastic elastomer and/or thermoset rubber having Durometer Shore A of 40-90.

It is another and/or alternative non-limiting object of the present disclosure to provide a method of inhibiting or preventing oxidation and/or corrosion of one or more components of a hitch mount assembly wherein the cover material has a thickness of about 1-10 mm.

It is another and/or alternative non-limiting object of the present disclosure to provide a method of inhibiting or preventing oxidation and/or corrosion of one or more components of a hitch mount assembly wherein the cover body has a partial spherical shape, a transition portion that is located below the top portion, and a base portion that is located below the transition portion, and wherein the base portion is configured to fit about a base of a ball joint of the hitch mount assembly.

It is another and/or alternative non-limiting object of the present disclosure to provide a method of inhibiting or preventing oxidation and/or corrosion of one or more components of a hitch mount assembly wherein the top portion of the cover body is configured to engage a portion of a top portion of the ball joint when the cover body is partially or fully placed on the ball joint, at least 50% of an interior surface of the top portion of the cover body engages a portion of the top portion of said ball joint when said cover body is partially or fully placed on the ball joint.

It is another and/or alternative non-limiting object of the present disclosure to provide a method of inhibiting or preventing oxidation and/or corrosion of one or more components of a hitch mount assembly wherein less than 50% of an interior surface of the transition portion contacts the ball joint when the cover body is placed on the ball joint.

It is another and/or alternative non-limiting object of the present disclosure to provide a method of inhibiting or preventing oxidation and/or corrosion of one or more components of a hitch mount assembly wherein the bottom portion of the cover body has a constant cross-sectional size and shape along at least 50% of the longitudinal length of the bottom portion.

It is another and/or alternative object of the present disclosure to provide a corrosion-inhibiting protection device that includes a visual indicator and/or includes date information to provide information to a user about whether the corrosion-inhibiting protection device needs to be replaced and/or the protective material on the corrosion-inhibiting protection device needs to be replaced.

It is another and/or alternative object of the present disclosure to provide an expiration or replacement date that is stamped or otherwise applied to the corrosion-inhibiting protection device so as to provide information to the user when the corrosion-inhibiting protection device needs to be replaced and/or the protective material on the corrosion-inhibiting protection device needs to be replaced.

It is another and/or alternative object of the present disclosure to provide a time indicator that is configured to visually display an operational time of the corrosion-inhibiting protection device so as to provide information to the user when the corrosion-inhibiting protection device needs to be replaced and/or the protective material on the corrosion-inhibiting protection device needs to be replaced.

These and other advantages will become apparent from the discussion of the distinction between the invention and the prior art and when considering the preferred embodiment shown in the accompanying drawings.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION

Figure 1A:
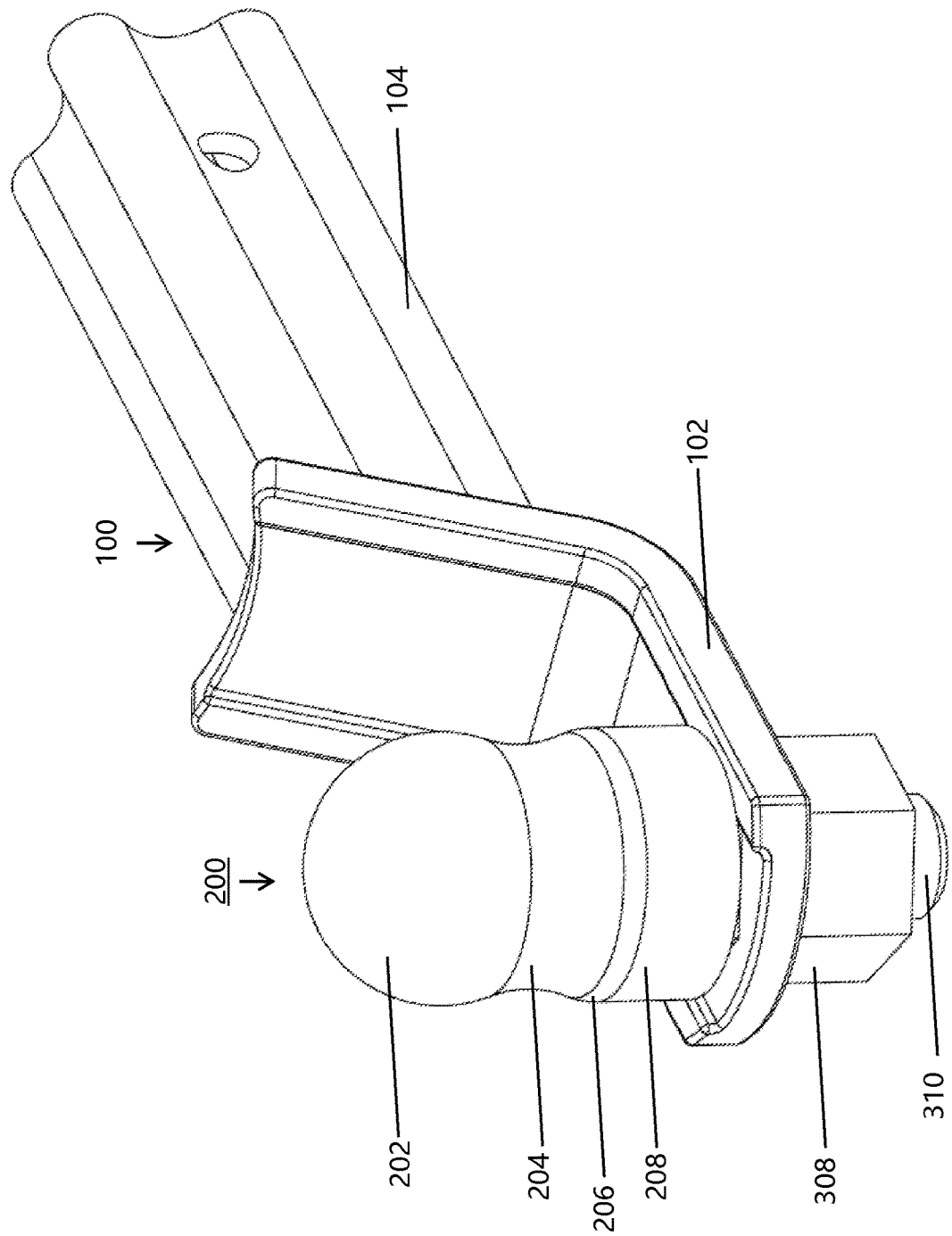
FIGS. 1A-1B illustrate a corrosion-inhibiting protection device in the form of a corrosion-inhibiting protective cover configured to protect at least a portion of a ball joint.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, all the intermediate values and all intermediate ranges).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Figure 1B:
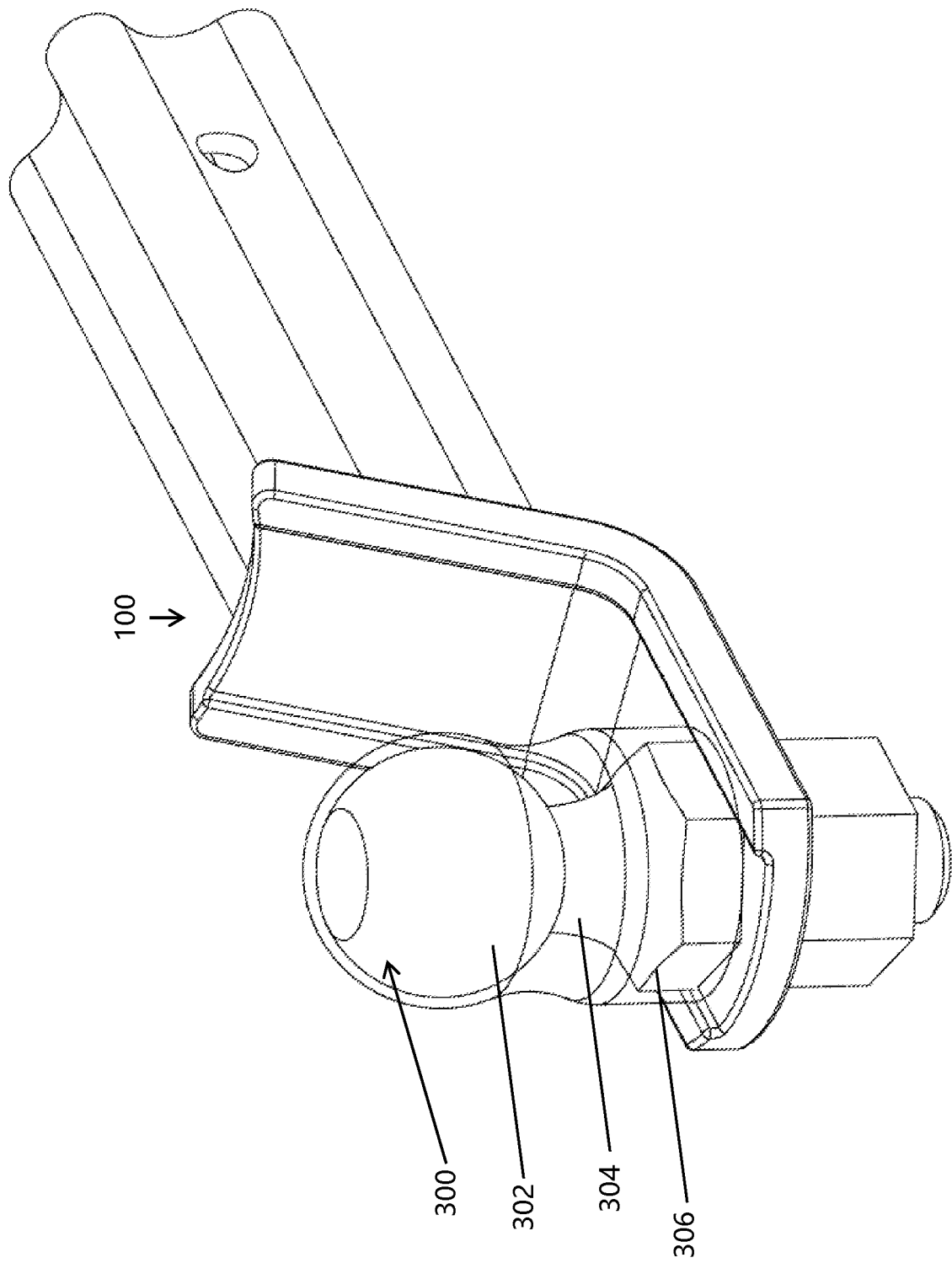

Referring now to FIGS. 1A-1B, there is illustrated a first non-limiting embodiment of a hitch mount 100 having corrosion protection. The primary components of the hitch mount 100 generally include, but are not limited to, a tongue 102 and a tube post 104. The tongue 102 is generally configured to receive a towing implement, such as a ball joint 300, commonly known in the art. The tube post 104 is configured to mate with a corresponding outer tube generally located beneath the bumper of a vehicle (not shown). Generally, a bolt, nut and optional washer assembly or a rod and cotter pin arrangement (not shown) are used to releasably secure the tube post 104 to the corresponding outer tube generally located beneath the bumper of a vehicle.

Corrosion-inhibiting protective cover 200 is configured to cover one or more components of an associated hitch mount assembly and provide corrosion protection to their respective components. More particularly, corrosion-inhibiting protective cover 200 is illustrated as a single-piece cover that includes a top portion 202, one or more transition portions 204, 206, and a bottom portion 208. The corrosion-inhibiting protective cover 200 is illustrated in FIGS. 1A-1B as being fitted about a portion of the ball joint 300.

As illustrated in FIG. 1B, the ball joint 300 includes a spherically-shaped top portion 302, a middle portion 304, a base portion 306, threaded end portion 310, and a nut 308. The top portion 302, middle portion 304, and base portion 306 are located above the top surface of tongue 102 when the ball joint 300 is connected to the tongue 102 by threading nut 308 on threaded end portion 310.

Corrosion-inhibiting protective cover 200 is shaped and sized to cover the top portion 302, middle portion 304, and base portion 306 of the ball joint 300 when the corrosion-inhibiting protective cover 200 is fully placed on the ball joint 300. The top portion 202 of the corrosion-inhibiting protective cover 200 has a partial spherical-shaped portion that is configured to the be placed about the spherically-shaped top portion 302 of the ball joint 300 as illustrated in FIG. 1B. The transition portions 204, 206 are illustrated as being arcuate in shape; however, the transition portions can have other shapes. The bottom portion 208 is illustrated as having generally constant circular cross-sectional shape along the longitudinal length of the bottom portion 208. As illustrated in FIGS. 1A-1B, the top portion 202 constitutes the largest portion of the corrosion-inhibiting protective cover 200. Generally, the bottom portion 208 constitutes the second largest portion of the corrosion-inhibiting protective cover 200; however, this is not required.

As illustrated in FIG. 1B, the top portion 202 is configured to cover, overlap, or encircle over 50% of the outer surface of top portion 302. Generally, the top portion 202 is configured to cover, overlap, or encircle 60-90% of the outer surface of top portion 302. The bottom portion 208 is illustrated as having a height or longitudinal length that is at least the same and generally greater than the height or longitudinal length of base portion 306 of the ball joint 300.

As best illustrated in FIG. 1B, a majority of inner surface of the top portion 202 of corrosion-inhibiting protective cover 200 contacts the outer surface of top portion 302 when the corrosion-inhibiting protective cover 200 is fully placed on the ball joint 300. The transition portions 204, 206 of corrosion-inhibiting protective cover 200 are fully or partially spaced from the outer surface of the ball joint 300 when the corrosion-inhibiting protective cover 200 is fully placed on the ball joint 300. The bottom portion 208 of corrosion-inhibiting protective cover 200 contacts the base portion 306 when the corrosion-inhibiting protective cover 200 is fully placed on the ball joint 300.

In some non-limiting embodiments, corrosion-inhibiting protective cover 200 is configured to be attached to and removed from the associated ball joint 300.

One or more portions of the corrosion-inhibiting protective cover 200 can be formed of or include a protective material which releases corrosion protection molecules. When corrosion-inhibiting protective cover 200 is placed about ball joint 300, the protective material is released from the corrosion-inhibiting protective cover 200 to provide corrosion protection to the ball joint 300. As can be appreciated, the released corrosion protection molecules can also provide corrosion protection to regions about the ball joint 300, such as threaded end portion 310, nut 308, tongue 102 and tube post 144.

When the corrosion-inhibiting protective cover 200 is a one-piece cover, the material used to form the corrosion-inhibiting protective cover 200 is generally a stretchable material having a Durometer Shore A of 40-90, and a thickness of about 1-10 mm. Generally, the stretchable material is able to reform to 90-100% of its original shape after being stretched. Such a feature of the material enables the corrosion-inhibiting protective cover 200 to be removed from and placed one or more times on ball joint 300 without damaging the corrosion-inhibiting protective cover 200 or ball joint 300. The material of the corrosion-inhibiting protective cover 200 is generally formed of a non-abrasive material such that the material does not scratch or otherwise damage ball joint 300 when the corrosion-inhibiting protective cover 200 is placed on and removed from ball joint 300. One non-limiting material that can be used to at least partially form the corrosion-inhibiting protective cover 200 is a thermoplastic vulcanizates TPV commercially available as Santoprene®. The material used to form the corrosion-inhibiting protective cover 200 is generally a mixture of protective material and thermoplastic elastomer (e.g., Santoprene®). In one non-limiting example, the material used to form the corrosion-inhibiting protective cover 200 includes 80-98 wt. % thermoplastic elastomer and 2-20 wt. % protective material (e.g., Zerust®).

In use, the corrosion-inhibiting protective cover 200 is configured to be stretched over top portion 302 of ball joint 300 and about the base portion 306 of ball joint 300 so as to provide corrosion and/or oxidation protection to the of ball joint 300 due to the release of corrosion protection molecules from the protective material that is mixed with the thermoplastic elastomer that is used to form the material of the corrosion-inhibiting protective cover 200. Once the corrosion resistance effectiveness of the corrosion-inhibiting protective cover 200 reduces below a level to provide desired corrosion protection to the ball joint 300, the corrosion-inhibiting protective cover 200 can simply be removed from the ball joint 300 and a new corrosion-inhibiting protective cover 200 can simply be placed on the ball joint 300.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A corrosion-inhibiting protection device in the form of a corrosion-inhibiting protective cover for use with a hitch mount assembly, said corrosion-inhibiting protective cover comprising a cover body having a size and shape to enable said cover body to at least partially cover or encircle at least a portion of the hitch mount assembly, said corrosion-inhibiting protective cover is configured to be retained on a portion of the hitch mount assembly by a shape and/or configuration of said cover body that facilitates in maintaining said cover body on a portion of the hitch mount assembly once the cover body is fully positioned on portion of the hitch mount assembly, said cover body including cover material that at least partially includes a protective material, said protective material formed of or including a material that releases corrosion protection molecules.

2. The corrosion-inhibiting protection device as defined in claim 1, wherein said cover body is shaped and/or configured to at least partially cover or encircle a ball joint.

3. The corrosion-inhibiting protection device as defined in claim 1, wherein said cover body is formed of a single piece of material.

4. The corrosion-inhibiting protection device as defined in claim 1, wherein said cover body is a) at least partially formed of said protective material, b) at least partially coated with said protective material, and/or c) includes a cavity that includes said protective material.

5. The corrosion-inhibiting protection device as defined in claim 1, wherein said protective material includes volatile corrosion inhibitors and/or vapor phase inhibitors.

6. The corrosion-inhibiting protection device as defined in claim 1, wherein said cover body is configured to cover 30-100 vol. % of a portion of the hitch mount assembly.

7. The corrosion-inhibiting protection device as defined in claim 1, wherein said hitch mount assembly includes a ball joint.

8. The corrosion-inhibiting protection device as defined in claim 1, wherein said cover material includes a thermoplastic elastomer and/or thermoset rubber.

9. The corrosion-inhibiting protection device as defined in claim 1, wherein said cover material includes 70-98 wt. % thermoplastic elastomer and/or thermoset rubber and 2-30 wt. % protective material.

10. The corrosion-inhibiting protection device as defined in claim 1, wherein said cover material includes a thermoplastic elastomer and/or thermoset rubber having Durometer Shore A of 40-90.

11. The corrosion-inhibiting protection device as defined in claim 1, wherein said cover material has a thickness of about 1-10 mm.

12. The corrosion-inhibiting protection device as defined in claim 1, wherein said cover material is a stretchable material that reforms to 90-100% of its original shape after being stretched.

13. A method of inhibiting or preventing oxidation and/or corrosion of one or more components of a hitch mount assembly comprising:
   a. providing a hitch mount assembly;
   b. providing a corrosion-inhibiting protective cover, said corrosion-inhibiting protective cover comprising a cover body having a size and shape to enable said cover body to at least partially cover or encircle at least a portion of the hitch mount assembly, said corrosion-inhibiting protective cover is configured to be retained on a portion of the hitch mount assembly by a shape and/or configuration of said cover body that facilitates in maintaining said cover body on a portion of the hitch mount assembly once the cover body is fully positioned on a portion of the hitch mount assembly, said cover body including a cover material that at least partially includes a protective material, said protective material formed of or includes a material that releases corrosion protection molecules;
   c. place said corrosion-inhibiting protective cover on about at least a portion of said hitch mount assembly; and,
   d. having said corrosion protection molecules that are released from said protective material at least partially protect one or more components of said hitch mount assembly from oxidation and/or corrosion.

14. The method as defined in claim 13, further including the step of stretching said cover material so as to place said cover body about at least a portion of said hitch mount assembly, said cover material is a stretchable material that reforms to 90-100% of its original shape after being stretched.

15. The method as defined in claim 14, wherein said cover material remains in a stretched state after said cover body has been placed on about at least a portion of said hitch mount assembly, a size of said cover body is at least 1% greater in said stretched state while said cover body is placed on about at least a portion of said hitch mount assembly.

16. The method as defined in claim 13, wherein said cover body is shaped and/or configured to at least partially cover or encircle a ball joint on said hitch mount assembly.

17. The method as defined in claim 13, wherein said cover body is formed of a single piece of material.

18. The method as defined in claim 13, wherein said cover body is a) at least partially formed of said protective material, b) at least partially coated with said protective material, and/or c) includes a cavity that includes said protective material.

19. The method as defined in claim 13, wherein said protective material includes volatile corrosion inhibitors and/or vapor phase inhibitors.

20. The method as defined in claim 13, wherein said cover body is configured to cover 30-100 vol. % of a portion of said hitch mount assembly.

21. The method as defined in claim 20, wherein said hitch mount assembly includes a ball joint.

22. The method as defined in claim 13, wherein said cover material includes a thermoplastic elastomer and/or thermoset rubber.

23. The method as defined in claim 22, wherein said cover material includes 70-98 wt. % thermoplastic elastomer and/or thermoset rubber and 2-30 wt. % protective material.

24. The method as defined in claim 13, wherein said cover material includes a thermoplastic elastomer and/or thermoset rubber having Durometer Shore A of 40-90.

25. The method as defined in claim 13, wherein said cover material has a thickness of about 1-10 mm.

26. The method as defined in claim 13, wherein said cover body has a partial spherical shape, a transition portion that is located below said top portion, and a base portion that is located below said transition portion, said base portion configured to fit about a base of a ball joint of said hitch mount assembly.

27. The method as defined in claim 26, wherein said top portion of said cover body is configured to engage a portion of a top portion of said ball joint when said cover body is place on said ball joint, at least 50% of an interior surface of said top portion of said cover body engages a portion of said top portion of said ball joint when said cover body is placed on said ball joint.

28. The method as defined in claim 26, wherein less than 50% of an interior surface of said transition portion contacts said ball joint when said cover body is placed on said ball joint.

29. The method as defined in claim 26, wherein said bottom portion of said cover body has a constant cross-sectional size and shape along at least 50% of the longitudinal length of said bottom portion.

* * * * *